INVENTOR.
SIDNEY H. HORWITZ
BY Hudson, Boughton,
Williams, David & Hoffmann
ATTORNEYS Oct. 31, 1961  S. H. HORWITZ  3,006,255
KEY CUTTING MACHINE
Filed July 2, 1959  3 Sheets-Sheet 3

INVENTOR.
SIDNEY H. HORWITZ
BY
ATTORNEYS

United States Patent Office 3,006,255
Patented Oct. 31, 1961

3,006,255
KEY CUTTING MACHINE
Sidney H. Horwitz, Cleveland, Ohio, assignor to The National Key Company, Cleveland, Ohio, a corporation of Ohio
Filed July 2, 1959, Ser. No. 824,606
5 Claims. (Cl. 90—13.05)

This invention relates to key cutting machines of the kind in which a desired profile is cut on a key blank by a rotary cutter to correspond with the profile of a template or of a key to be duplicated, the key blank and template being mountable on a traversing and swingable carriage for engagement respectively with the cutter and a cutting guide.

An object of this invention is to provide a key cutting machine of this type which is of a simple and compact construction and which will be reliable and accurate in performance.

Another object is to provide a key cutting machine of the type mentioned having novel actuating and control means by which the operation of the machine is made easy and semiautomatic in character.

Still another object is to provide a novel key cutting machine having a rotatable cutter and a clutch-controlled traverse mechanism both driven by an electric motor and which machine also comprises switch means for controlling the energization of the motor in accordance with the actuation of the clutch or, if desired, independently of the clutch actuation.

A further object is to provide a key cutting machine having a novel cutting guide for co-operation with the template or key to be duplicated.

Additionally, this invention provides a key cutting machine of the general character indicated in the foregoing paragraphs and which includes a frame portion forming a gear chamber for drive gearing employed in a novel relation to the rotary cutter and the clutch means.

Other objects and advantages of this invention will be apparent in the following detailed description and in the accompanying drawings forming a part of this specification and in which, FIG. 1 is a plan view of a key cutting machine embodying the present invention, portions of the machine being broken away for better illustration of certain components thereof;

Figure 1:
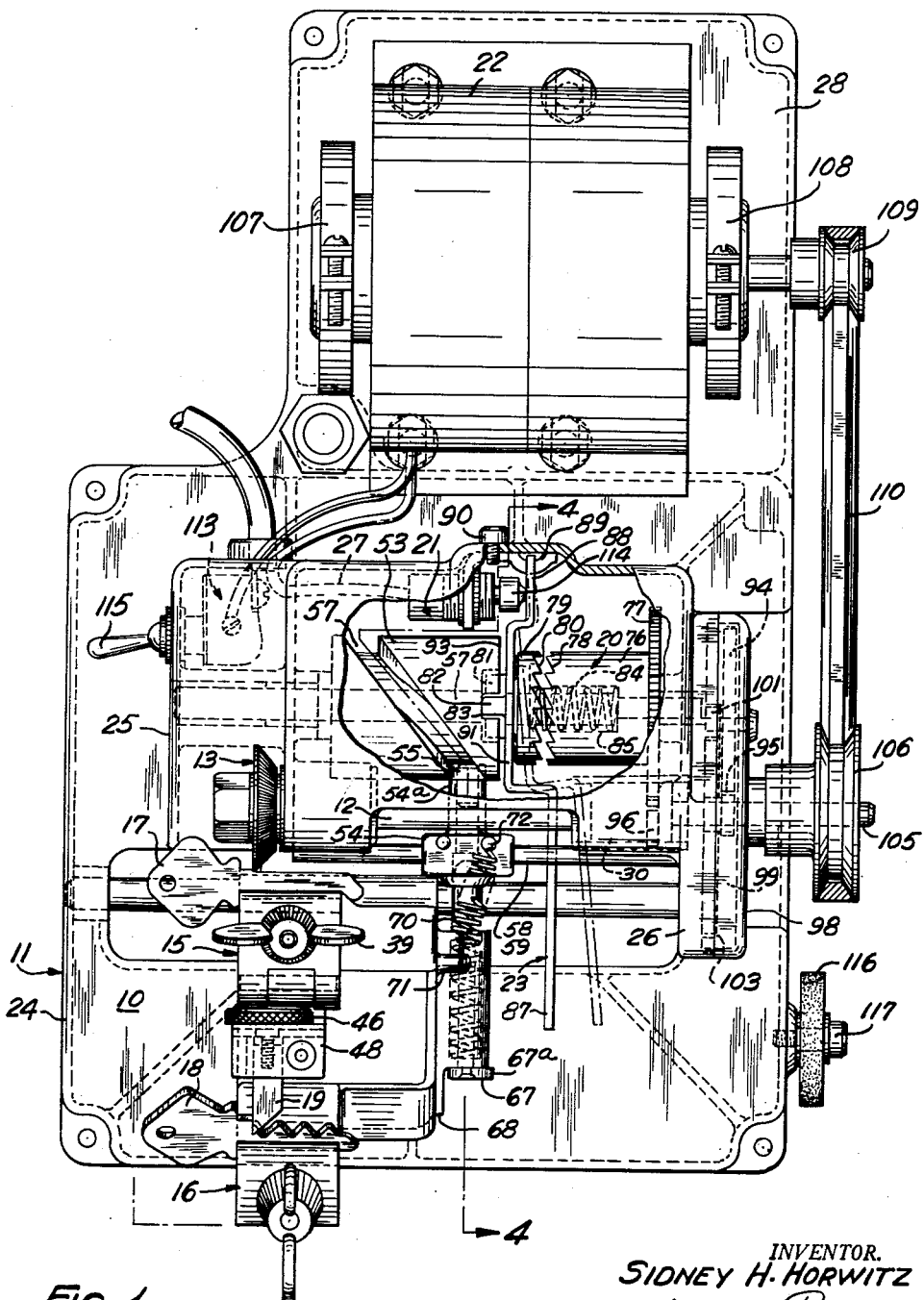

As a preferred embodiment of this invention the drawings show a key cutting machine 10 which comprises, in general, a frame structure 11, a spindle 12 carrying a rotatable cutter 13, and a carriage 14 having work supports 15 and 16 thereon, and which carriage is mounted for both a traverse and an in-and-out swinging movement relative to the cutter. The work supports 15 and 16 are adapted to receive and hold, respectively, a key blank 17 on which a profile is to be cut by the cutter 13, and a template or key 18 whose profile is to be duplicated on the key blank and which template or key is engageable with a cutting guide 19 as a feeler member.

The machine 10 also comprises a clutch device 20 of the one-cycle or single-revolution type as a part of the transverse mechanism of the machine, and a control switch 21 controlling an electric driving motor 22 concomitantly with the actuation of the clutch device to clutch-engaged and clutch-disengaged conditions. The control switch 21 is associated with a manually operable control member or lever 23 by which the clutch device is actuated to its clutch-engaged condition as explained hereinafter.

The frame structure 11 comprises a lower portion forming a base 24 on which the machine is adapted to stand and an upper portion which includes laterally spaced upright end walls 25 and 26 rising above the base and serving a purpose to be explained hereinafter. The upper portion of the frame 11 also includes an upwardly and forwardly curving top wall or hood portion 27 extending between and connecting the spaced end walls 25 and 26. The frame 11 also includes a motor support portion 28 on which an electric driving motor 22 is adapted to be mounted. A pair of suitable bearings 29 and 30 provided on the hood portion 27 support the rotatable spindle 12.

The carriage 14 comprises a lower sleeve portion 31 and a pair of divergent arms 32 and 33 having the work supports 15 and 16 located thereon. The frame structure 11 includes a guide means extending substantially parallel with the spindle 12 and here shown in the form of a rod 34 of a circular cross-sectional shape and having its ends suitably mounted in laterally spaced portions of the base 24. The sleeve portion 31 of the carriage is slidable on the guide rod 34 so as to provide for the traverse movement of the key blank 17 relative to the cutter 13, and is also rockable on the guide rod to provide for the in-and-out swinging movement of the blank relatives to the cutter. During these traversing and swinging movements the blank 17 is operated on by the cutter 13 to cut or generate the desired profile thereon in accordance with the co-operative engagement of the template 18 with the cutting guide 19.

The work holders 15 and 16 are clamping devices of a conventional form each comprising a rest portion 35 and a swingable jaw 36 movable toward and away from the rest portion for clamping co-operation with the latter by being mounted on a pivot pin 37. Each workholder also comprises a screw 38 projecting from the rest portion and having a threaded portion extending through the swingable jaw 36 and engaged by a wing nut 39. Tightening of the wing nut 39 applies pressure to the jaw 36 for imparting closing movement to the latter for clamping the key or key blank against the rest portion 35. A compression spring 40 is preferably provided on the screw 38 and is located between the rest portion 35 and the jaw 36 for imparting opening movement to the latter in response to unscrewing of the wing nut 39.

In the workholder devices 15 and 16, the rest portion 35 is formed by the top of the arms 32 and 33 and includes an abutment shoulder 41 formed by a projection of the rest portion which extends toward the jaw 36. The shoulder 41 provides a locating means for the key or key blank when the latter is inserted between the rest portion and the associated clamping jaw. The shoulder 41 is elongated in the direction of the axis of the spindle 12 and extends transversely across the rest portion 35 so as to be engaged by the key or key blank along a substantial portion of the length of the rear edge thereof.

Figure 2:
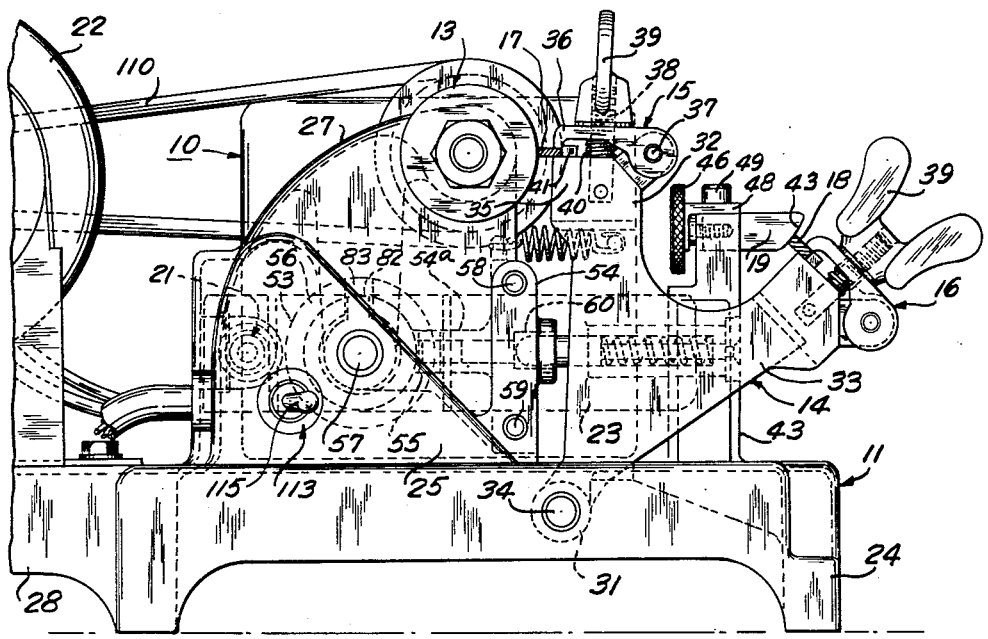
FIG. 2 is an end elevation of the machine but with portions of the driving motor omitted.
Figure 3:
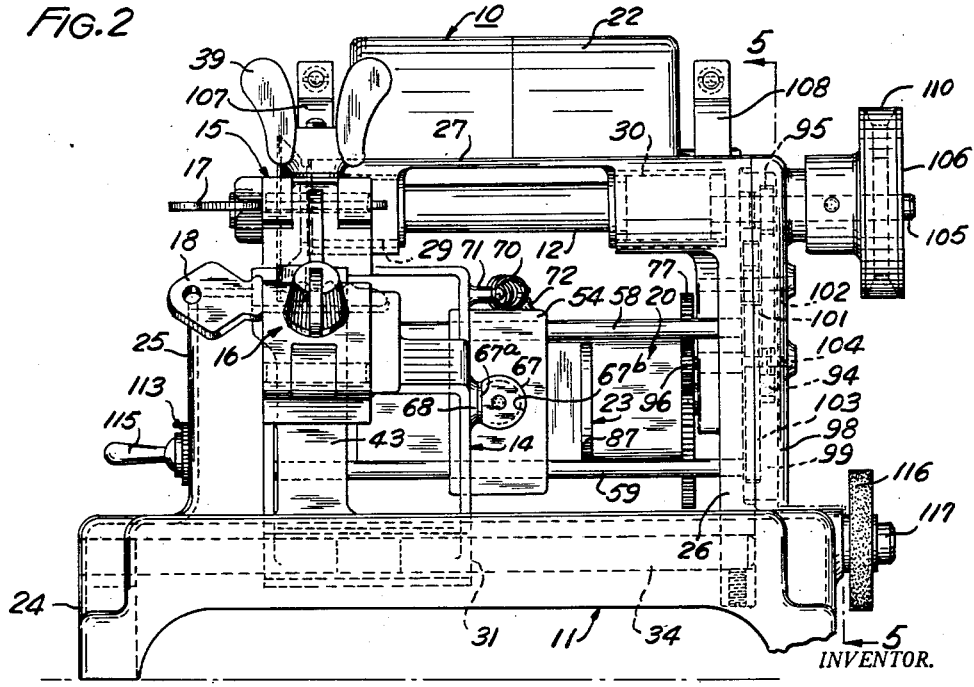
FIG. 3 is a front elevation of the machine.

The cutting guide 19 comprises an elongated feeler member in the form of a bar of a regular cross-sectional shape, in this case of a square or rectangular cross-sectional shape, and which bar is slidably movable in a guideway 42 provided in the upper end of a support post 43 of the frame structure 11. The bar forming the cutting guide 19 is bevelled at the outer end thereof, preferably in two directions, so as to provide a sloping reference edge 44 against which the irregular profile of the template or key blank 18 is engageable, as shown in FIG. 2. The bar forming the cutting guide 19 also has a threaded opening 45 therein which extends into the bar lengthwise thereof and is located so as to be substantially coincidental with the central longitudinal axis of the bar.

In its assembled position the cutting guide 19 is slidable in the guideway 42 for adjustment of the location of the reference edge 44 and, for this purpose, an adjusting screw 46 is provided having a threaded stem 47 engaged in the threaded opening 45. An anchor bracket 48 secured on the post 43 by a suitable screw 49 has a leg or plate portion 50 overlying the guideway 42 for retaining the cutting guide 19 in the latter. The bracket 48 also has a depending yoke portion 51 which straddles the stem 47 of the screw 46 by engaging in an annular groove 47$^a$ of the stem for holding the screw against endwise movement.

Rotation of the screw 46 in opposite directions will accordingly produce accurate in-and-out adjustments of the reference edge 44 and, since the location of the threaded opening 45 is on the central axis of the cutting guide, the adjusting action of the screw will always be in a true axial direction lengthwise of the cutting guide without any force component tending to cause tilting of the cutting guide such as would result in an inaccurate positioning of the reference edge 44.

For producing a power actuation of the traverse movement of the carriage 14, the machine 10 is provided with a rotary cam 53 which is adapted to be driven and a reciprocable slide 54 having a cam follower, preferably in the form of a roller 55, co-operating with the rotary cam. The cam 53 is here shown as being in the form of a drum having an endless helical cam groove 56 therein and which drum is rotatably supported by a shaft 57 suitably mounted in the frame 11.

The slide 54 is here shown as being mounted on a pair of upper and lower guide bars 58 and 59 which extend between the end walls 25 and 26 and are suitably mounted in the latter. The slide 54 includes a projection 54$^a$ which extends toward the cam drum 53 and has the roller 55 mounted thereon. The slide 54 is also provided with a socket 60 extending thereinto from the opposite or front side thereof so as to be aligned substantially with the rotation axis of the roller 55.

Figure 4:
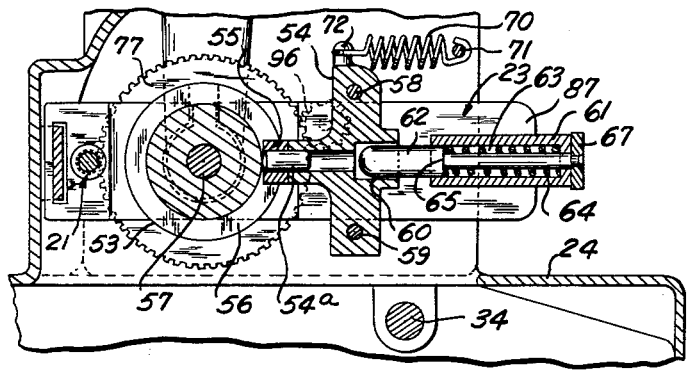
FIG. 4 is a partial vertical section taken through the traverse means for the carriage, the view being taken substantially as indicated by section line 4—4 of FIG. 1.
Figures 6, 7:
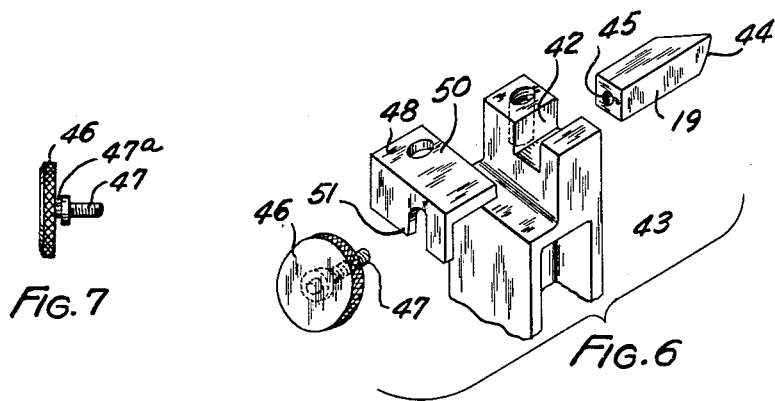
FIG. 6 is an exploded view in perspective form showing the cutting guide and its mounting and adjusting means.
FIG. 7 is an elevation of the cutting guide adjusting screw in detached relation.
Figure 5:
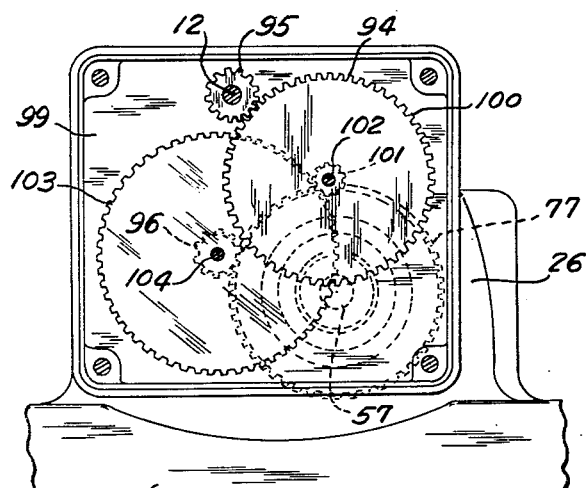
FIG. 5 is a partial end elevation of the machine when viewed as indicated by the directional line 5—5 of FIG. 3 and with the cover of the gear case removed.

The carriage 14 is detachably connected with the slide 54 and, for this purpose, the carriage is provided with a sleeve portion 61 and a connecting pin 62 slidable in the passage 63 of such sleeve portion and engageable in the socket 60 as shown in FIGS. 2 and 4 of the drawings. A compression spring 64 located in the passage 63 and effective against a shoulder 65 of the pin 62 normally holds the latter in an extended position and engaged in the socket 60.

The cam drum 53 can be rotatably driven by the motor 22 through the clutch device 20 and other transmission means which will be presently described and, when the pin 62 of the carriage 14 is engaged in the socket 60 of the slide 54, the carriage will be power-actuated during the traverse movement thereof. Because of the endless character of the cam groove 56, the traverse movement of the carriage 14 will be a reciprocating movement consisting of one passage or stroke of the key blank 17 toward the left, as seen in FIG. 1, across the cutter 13 followed by a second or return passage or stroke of the key blank in the opposite direction across the cutter.

The cutting of the profile on the key blank 17 can be accomplished during either of these passages or strokes but is preferably performed partially during each such passage.

Whenever the pin 62 is retracted from the socket 60, the carriage 14 is thereby disconnected from the slide 54 and can then be actuated manually during its traversing movement relative to the cutter 13. To provide for the retraction of the connecting pin 62, this member is provided at the outer end thereof with a knob 67 to which a manual pulling force can be applied for disengaging the pin from the socket 60 in opposition to the spring 64.

The knob 67 is of a disc-like shape having a truncated edge or flat 67$^a$ at one point thereof and another or remaining edge portion 67$^b$ of greater radial width. When the knob 67 is retracted and rotated, the edge portion 67$^b$ thereof will overlie and engage against a stop shoulder 68 provided on the carriage 14. When the edge portion 67$^b$ overlies and is in engagement with the shoulder 68, the connecting pin 62 will be in a locked-out position and disengaged from the socket 60. As long as the pin remains in this locked-out position, the carriage 14 will be manually actuatable for causing the traverse movements thereof.

The carriage 14 is also normally connected with the slide 54 by a tension spring 70 extending between the carriage and the slide. This tension spring has hook-shaped ends, one of which is attached to an anchor pin 71 of the carriage and the other of which is releasably connected with an anchor pin 72 of the slide. The pulling force of the spring 70 normally causes an inward swinging movement of the carriage 14 for pressing the key blank 17 against the cutter 13 and the template 18 against the reference edge 44 of the cutting guide 19. When the hook-shaped end of the spring 70 is manually disconnected from the anchor pin 72, the carriage can be manually swung on the guide rod 34 so that the in-and-out swinging movements of the carriage can be produced manually as well as the traverse movements thereof.

The clutch device 20 is of the kind known as a one-revolution or single-trip clutch device which will operate to transmit power as soon as the clutch has been manually actuated to an engaged condition and will automatically discontinue the transmission of power when one revolution of the driven rotatable member, in this case the cam drum 53, has taken place. The clutch device 20 can be of a conventional form and comprises a clutch member 76 rotatably supported by the shaft 57 and having a gear 77 formed thereon or secured thereto at one end thereof. At the other end thereof, the clutch member 76 is provided with an annular group of clutch teeth 78.

The clutch device 20 also comprises a shiftable clutch member 79 having on one side thereof an annular group of clutch teeth 80 for co-operation with the clutch teeth 78 of the clutch member 76, and having on the opposite side thereof an axial projection 81 extending into a recess in the adjacent end of the cam drum 53. The axial projection 81 of the clutch member 79 includes a radial lug 82 which is engageable in a corresponding radial slot 83 of the clutch drum as shown in FIG. 1 of the drawings. A compression spring 84 located in an axial recess 85 of the clutch member 76 and surrounding the shaft 57 is effective against the shiftable clutch member 79 and normally urges the latter toward the left, as seen in FIG. 1, for engaging the lug 82 in the slot 83.

The clutch member 79 is shiftable toward a clutch-engaged position with the teeth 80 in mesh with the teeth 78 by means of the manually operable lever 23 and is shiftable in the opposite direction to its clutch-disengaged position shown in FIG. 1 by the compression spring 84. The slot 83 of the cam drum 53 provides a clearance space for the lug 82 and accommodates the latter when the clutch member 79 is moved to its clutch-disengaged position.

The lever 23 has a forwardly projecting free end forming a handle 87 adapted to be manually grasped or pushed and has an inner end portion 88 which is fulcrumed on the frame structure 11 as by means of a bracket 89 secured to the latter by one or more attaching screws 90. At an intermediate point thereof the lever 23 is provided with an axially offset portion 91 on which the clutch member 79 is mounted.

The clutch drum 53 has an annular end face 93 extending around the recess thereof and which is flat for its full annular extent except for the interruption therein formed by the radial slot 83. When the clutch member 79 is moved to its clutch-engaged position by manual swinging of the lever 23 toward the right, the lug 82 is withdrawn from the slot 83 and the rotation imparted to the cam drum by the then driven clutch member 79 causes the flat portion of the end face 93 to move under the free edge of the lug 82. The lug 82 then rides on the flat end surface 93 during the remainder of a single revolution of the cam drum 53 and, upon completion of such single revolution, the lug drops into the slot under the influence of the spring 84 and the clutch member 79 is thereupon disengaged from the clutch member 76 to interrupt the delivery of power to the cam drum.

From the operation of the clutch device 20 as above described, it will be seen that whenever the lever 23 is manually swung toward the right to engage the clutch, the cam drum 53 will be rotated through one complete revolution to produce forward and return traverse movements of the carriage 14. As soon as the single revolution of the cam drum has been completed and the clutch device 20 has been actuated to its disengaged condition, the traverse movement of the carriage 14 will automatically be stopped.

Driving torque is supplied to the clutch member 76 through a gear train 94 which includes an input gear or pinion 95 fixed on the cutter spindle 12 and an output gear or pinion 96 meshed with the gear member 77.

The frame 11 is constructed so that the wall 26 thereof and a cover 98 suitably secured to the ltater co-operate to form a gear case having a substantially closed gear chamber 99 therein adapted to retain lubricant. In addition to the input gear 95 and the output gear 96, the gear train 94 also comprises gear and pinion members 100 and 101 mounted on a counter shaft 102 and a gear member 103 which is connected with the output gear 96 and mounted on a second counter shaft 104. The gear members 95, 100, 101 and 103 are all located in the gear chamber 99 and are lubricated by the lubricant retained in the latter.

The cutter spindle 12 extends through the gear chamber 99 and has an end portion 105 projecting from the latter and carrying a drive pulley 106. The driving motor 22 is suitably mounted on the support portion 28 of the frame 11 as by means of resilient bushing mounts 107 and 108 and has a drive pulley 109 connected with the pulley 106 by a suitable belt 110. The motor 22 thus forms a power means for rotating the cutting tool 13 and for also rotating the cam drum 53 for producing the above-described power actuated traverse movement of the carriage 14.

The motor 22 is controlled by the above-mentioned switch 21 and can also be controlled by a second switch 112. The switch 21 is supported adjacent the end portion 88 of the lever 23, preferably by the bracket 89, and the second switch 112 is suitably mounted on another portion of the frame structure such as on the end wall 25.

The switch 21 is a normally open switch and has a movable actuating member 114 projecting therefrom and engaging the end portion 88 of the lever 23. When the lever 23 is swung toward the right to produce the clutch-engaged condition of the clutch device 20, the switch 21 will assume a closed position to produce energization and starting of the motor 22. When the lever 23 returns to its full line rest position shown in FIG. 1 upon the completion of the single revolution of the clutch device 20, the switch 21 is actuated to its open position to de-energize and stop the motor 22.

The second switch 113 is located in a circuit portion of the energizing circuit for the motor 22 which is in parallel with the circuit portion containing the switch 21. The switch 113 is manually actuatable to closed and open positions by the movable switch member 115 thereof.

The switch 113 is provided so that when the carriage 14 has been disconnected from the slide 54, the motor 22 can be operated to drive the cutter 13 while the slide is moved manually through its in-and-out and traversing movements to produce the desired co-operation of key members 17 and 18 with the cutter and cutting guide. If desired, the switch 113 could be omitted from the machine.

The machine 10 can also be provided with a deburring brush 116, such as a suitable cylindrical wire brush, which is here shown as being mounted on the base 24 of the machine by a suitable mounting screw 117. When the desired profile has been cut on the key blank 18, the profile portion can be rubbed across or through the brush 116 to dislodge any existing burrs on the blank.

From the accompanying drawings and the foregoing detailed description it will now be understood that this invention provides a novel, simple and compact key cutting machine which will operate as a semiautomatic machine with a smooth and accurate performance. Since the detailed operation of the machine and the advantages thereof have already been described hereinabove, they need not be repeated at this point.

Although the key cutting machine of this invention has been illustrated and described herein to a somewhat detailed extent, it will be understood, of course, that the invention is not to be regarded as being limited correspondingly in scope but includes all changes and modifications coming within the terms of the claims hereof.

Having described my invention, I claim:

1. In a key cutting machine, a frame, a rotatable cutter supported by said frame, a carriage mounted for traversing movement relative to said cutter, workholder means on said carriage for holding a key blank to be operated on by said cutter, feeler and profile members co-operably effective between said frame and carriage for controlling cutter-engaging movement of said key blank, an electrically energizable motor for rotating said cutter, drive means effective between said motor and carriage for causing the traversing movement of the latter including a rotatable clutch means having a clutch member shiftable axially of the clutch rotation axis to engaged and disengaged positions, manual means comprising a lever extending transversely of said rotation axis and swingable through an engaging movement for shifting said clutch member to its engaged position to start said traversing movement, releasing means for shifting said clutch member to its disengaged position to terminate said traversing movement, said lever being swingable through a return movement by said releasing means, and switch means controlling the motor energization and co-operably disposed relative to said lever to be actuatable in response to the engaging and return engagements of said lever for causing starting and stopping of said motor.

2. In a key cutting machine, a frame, a spindle rotatable in said frame and having a cutter mounted thereon, a carriage, guide means extending substantially parallel with said spindle, workholder means on said carriage for holding a key blank to be operated on by said cutter, said carriage having a traversing movement along said guide means and relative to said cutter, said carriage also being swingable on said guide means for in-and-out movement toward and away from said cutter, feeler and profile members co-operably effective between said frame and carriage for controlling cutter-engaging movement of said key blank, an electrically energizable motor for rotating said cutter, drive means effective between said motor and carriage for causing the traversing movement of the latter including a rotatable clutch means having a clutch member shiftable axially of the clutch rotation axis to engaged and disengaged positions, manual means comprising a lever extending transversely of said rotation axis and swingable in one direction through an engaging movement for shifting said clutch member to its engaged position to start said traversing movement, releasing means for shifting said clutch member to its disengaged position to terminate said traversing movement, said lever being swingable in the opposite direction through a return movement by said releasing means, and switch means controlling the motor energization and co-operably disposed relative to said lever to be actuatable in response to the engaging and return movements of said lever for causing starting and stopping of said motor.

3. In a key cutting machine, a frame, a spindle rotatable in said frame and having a cutter mounted thereon, a carriage, guide means extending substantially parallel with said spindle, workholder means on said carriage for holding a key blank to be operated on by said cutter, said carriage having a traversing movement along said guide means and relative to said cutter, said carriage also being swingable on said guide means for in-and-out movement toward and away from said cutter, feeler and profile members co-operably effective between said frame and carriage for controlling cutter-engaging movement of said key blank, an electrically energizable motor for rotating said cutter, drive means effective between said motor and carriage for causing the traversing movement of the latter including a rotatable clutch means having a clutch member shiftable axially of the clutch rotation axis to engaged and disengaged positions, manual means comprising a lever extending transversely of said rotation axis and swingable in one direction through an engaging movement for shifting said clutch member to its engaged position to start said traversing movement, releasing means for shifting said clutch member to its disengaged position to terminate said traversing movement, said lever being swingable in the opposite direction through a return movement by said releasing means, circuit means for energizing said motor, a first switch in one portion of said circuit means for controlling the motor energization and being co-operably disposed relative to said lever to be actuatable in response to the engaging and return movements of said lever for causing starting and stopping of said motor, and a manually operable second switch located in a circuit portion in parallel with said one portion for energizing said motor independently of the shifting of said clutch member.

4. In a key cutting machine, a frame, a rotatable cutter supported by said frame, a carriage mounted for traversing movement relative to said cutter, workholder means on said carriage for holding a key blank to be operated on by said cutter, feeler and profile members co-operably effective between said frame and carriage for controlling cutter-engaging movement of said key blank, an electrically energizable motor for rotating said cutter, drive means effective between said motor and carriage for causing the traversing movement of the latter including a one-cycle rotatable clutch means having a clutch control lever manually movable to a clutch-engaged position to start said traversing movement and automatically movable to a clutch-disengaged position upon completion of the cycle to terminate said traversing movement, said lever having a free-end handle portion located on one side of the rotation axis of said clutch means and a fulcrumed end on the opposite side of said axis and fulcrumed on said frame, and a switch controlling the energization of said motor, said switch being supported by said frame adjacent said fulcrumed end and comprising a movable switch portion actuatable by the latter, said switch being normally open when said lever is in the clutch-disengaged position and being closed when said lever is in the clutch-engaged position.

5. In a key cutting machine having a rotatable cutter and a carriage mounted for swinging and traversing movement relative to said cutter, a frame, workholder means on said carriage and adapted to hold a member having a profile portion to be duplicated, means on said frame providing a guide passage, a cutting guide comprising a bar slidable in said passage and having a feeler portion engageable by said profile portion, a rotatable member having a push-pull threaded connection with said bar, and yoke means in holding co-operation with said rotatable member to render the latter reactively effective on said bar, said bar having a cross-sectional shape of a regular but noncircular form and said threaded connection having its rotation axis substantially coincident with the central longitudinal axis of said bar.

References Cited in the file of this patent

UNITED STATES PATENTS

| | | |
|---|---|---|
| 1,961,516 | Hansen | June 5, 1934 |
| 2,645,978 | Sejarto et al. | July 21, 1953 |